United States Patent
Mardiks (10) Patent No.: US 9,819,489 B2
(45) Date of Patent: Nov. 14, 2017

(54) DEVICE FOR CONTROLLING ACCESS TO USER-SELECTABLE CONTENT

(75) Inventor: Eitan Mardiks, Ra'anana (IL)

(73) Assignee: SANDISK IL, LTD., Saba (IL)

( * ) Notice: Subject to any disclaimer, the term of this patent is extended or adjusted under 35 U.S.C. 154(b) by 1385 days.

(21) Appl. No.: 12/152,508

(22) Filed: May 14, 2008

(65) Prior Publication Data

US 2009/0287349 A1    Nov. 19, 2009

(51) Int. Cl.
| | |
|---|---|
| *G06Q 10/00* | (2012.01) |
| *G06F 17/00* | (2006.01) |
| *H04L 9/32* | (2006.01) |
| *G06Q 30/06* | (2012.01) |

(52) U.S. Cl.
CPC ............... *H04L 9/32* (2013.01); *G06Q 30/06* (2013.01)

(58) Field of Classification Search
CPC .................................. G06F 17/00; H04L 9/32
USPC .................................................................. 705/51
See application file for complete search history.

(56) References Cited

U.S. PATENT DOCUMENTS

| | | | | |
|---|---|---|---|---|
| 5,910,987 | A * | 6/1999 | Ginter ..................... | G06F 21/10 348/E5.006 |
| 6,389,541 | B1  | 5/2002 | Patterson | |
| 6,748,539 | B1 * | 6/2004 | Lotspiech ...................... | 726/20 |
| 7,149,545 | B2 * | 12/2006 | Hurst et al. .................... | 455/558 |
| 7,209,900 | B2  | 4/2007 | Hunter et al. | |
| 7,218,991 | B2 * | 5/2007 | Walker et al. ................. | 700/234 |
| 7,295,608 | B2 * | 11/2007 | Reynolds ................ | H04L 29/06 375/240 |
| 7,555,779 | B2 * | 6/2009 | Nakano et al. .................. | 726/26 |
| 7,577,496 | B2 * | 8/2009 | Walker et al. ................. | 700/236 |
| 7,685,636 | B2 * | 3/2010 | Leake, Jr. ............... | G06F 21/10 713/185 |
| 7,971,070 | B2 * | 6/2011 | Lotspiech ........ | G11B 20/00086 380/201 |
| 8,028,173 | B2 * | 9/2011 | Widergren et al. .......... | 713/193 |
| 2005/0109842 | A1 * | 5/2005 | Walker et al. ................. | 235/381 |
| 2005/0190616 | A1 * | 9/2005 | Widergren et al. ........... | 365/200 |
| 2006/0064761 | A1  | 3/2006 | Multerer et al. | |
| 2006/0069644 | A1  | 3/2006 | Vataja et al. | |
| 2006/0200865 | A1 * | 9/2006 | Leake, Jr. ............... | G06F 21/10 726/27 |
| 2010/0004781 | A1 * | 1/2010 | Walker et al. ................. | 700/236 |

OTHER PUBLICATIONS

Office Action for U.S. Appl. No. 12/152,507, dated Feb. 18, 2011, 11 pages
Office Action for U.S. Appl. No. 12/152,507, dated Aug. 29, 2011, 10 pages.

* cited by examiner

*Primary Examiner* — Michael K Collins
(74) *Attorney, Agent, or Firm* — Brinks Gilson & Lione (57) ABSTRACT

A device having user-selectable content includes a storage having the capacity to store pre-loaded content and a controller. The controller is operative to manage access to the pre-loaded content, by way of limiting the access to a user-selected portion of the pre-loaded content. The controller limits access subject to and performed according to an indication of an initial purchase transaction. Also provided is a controller that includes a processing unit and an interface to a memory. The processing unit is operative to manage access to pre-loaded content stored on the memory.

29 Claims, 5 Drawing Sheets

DEVICE FOR CONTROLLING ACCESS TO USER-SELECTABLE CONTENT

FIELD OF THE INVENTION

The present invention relates generally to the digital storage technology. More particularly, the invention relates to a device configured to have user-selectable content.

BACKGROUND OF THE INVENTION

Since the introduction of digital storage technologies more products are launched for enhancing the end-user experience. Some of these products provide electronic delivery of content, such as text, video and music.

Current music distribution systems require online connection to a computer network, such as the Internet. These products are configured to enable controlled consumption of digital media consumption while allowing content providers to express content rights. The content is inaccessible to a user until a payment or use authorization occurs via a real-time authorization process. Payment or use authorization occurs via a real-time authorization process, whereby the user enters account. The account is transmitted to a payment server computer and is processed. In response, the user is billed by the content provider on-line.

However, on-line connection to the Internet is not always feasible. Furthermore, content providers are reluctant to make full-quality music and other content available to consumers via direct satellite broadcasting or the Internet because of the risk that exact copies of their materials, their core asset, will leave their control and freely circulate among consumers.

It is with respect to these and other considerations that the present invention has been made.

SUMMARY OF THE INVENTION

In view of the foregoing observations and the present needs, it would be advantageous to have a device having user-selectable content operative to manage access to the pre-loaded content. The access management may include limiting the access to a user-selected portion of the pre-loaded content and making such limited access subject to and performed according to an indication of an initial purchase transaction. Embodiments, various examples of which are discussed herein, may also include a method of controlling access to user-selectable content, a card vending machine and a method of vending a memory card by a card vending machine.

The pre-loaded content may include audio, video, still images, text, picture, computer program, or any combination thereof. The pre-loaded content is typically pre-paid content that is accessible via off-line connection. Note that this prepaid content may also be loaded onto the device as encrypted.

Embodiments, various examples of which are discussed herein, include a device having user-selectable content, the device including a storage having the capacity to store pre-loaded content; and a storage controller that is operative to manage access to the pre-loaded content. Such access management includes limiting the access to a user-selected portion of the pre-loaded content and making such limited access subject to and performed according to an indication of an initial purchase transaction.

The initial purchase transaction may be based on predetermined criteria for size and type of the user selected portion, and the access management that is performed by the storage controller may further include applying the predetermined criteria for delineating the user-selected portion of the pre-loaded content. The indication of the initial purchase transaction may include an identification of the user-selected portion. Information about the initial and any subsequent purchase transactions may be conveyed to an external device.

The pre-loaded content may include a plurality of user-selectable portions of the pre-loaded content, and the indication of the initial purchase transaction may include initial permission to use only one of the plurality of user-selectable portions of the pre-loaded content. Additionally or optionally, the pre-loaded content may include a plurality of user-selectable portions of the pre-loaded content, one of which being the user-selected portion. As such, the access management may include expanding the access to another one or more of the plurality of user-selectable portions of the pre-loaded content. The expandable access is subject to and performed according to a subsequent indication of one or more subsequent purchase transactions corresponding to such one or more user-selectable portions of the pre-loaded content.

The access management being performed by the storage controller may include enabling a preview to the pre-loaded content and making such preview independent of and unrelated to the indication of the initial purchase. The access management by the storage controller may further include receiving an identification of the user-selected portion from a playing device interface that facilitates user selections.

The pre-loaded content may include audio, video, still images, text, picture, computer program, or any combination thereof. The pre-loaded content may be encrypted. Accordingly, the access management that is performed by the storage controller may further include decrypting the encrypted pre-loaded content.

The storage may have a configuration that complies with a memory card format, including a secured digital (SD) memory card format and a multimedia card (MMC) format. The storage may be a flash memory.

In another embodiment of the foregoing approach, a storage controller includes a controller interface that is operative to reversibly connect the storage controller to a device; and a processing unit that is coupled to the controller interface. The device has access to pre-loaded content. The processing is operative to manage access to the pre-loaded content. Such access management includes limiting the access to a user-selected portion of the pre-loaded content and making such limited access subject to and performed according to an indication of an initial purchase transaction.

The indication of the initial purchase transaction may include an identification of the user-selected portion. Information about the initial and any subsequent purchase transactions may be conveyed to a remote device. The initial purchase transaction may be based on predetermined criteria for size and type of the user selected portion, and the access management by the storage controller may further include applying the predetermined criteria for delineating the user-selected portion of the pre-loaded content. The access management by the storage controller may include enabling a preview to the pre-loaded content and making such preview independent of and unrelated to the indication of the initial purchase.

The pre-loaded content may include a plurality of user-selectable portions of the pre-loaded content, and the indication of the initial purchase transaction may include initial permission to use only one of the plurality of user-selectable portions of the pre-loaded content. Additionally or optionally, the pre-loaded content may include a plurality of user-selectable portions of the pre-loaded content, one of which being the user-selected portion. As such, the access management may include expanding the access to another one or more of the plurality of user-selectable portions of the pre-loaded content. The expandable access is subject to and performed according to a subsequent indication of one or more subsequent purchase transactions corresponding to such one or more user-selectable portions of the pre-loaded content.

The access management being performed by the storage controller may further include receiving an identification of the user-selected portion from a playing device interface that facilitates user selections. With the pre-loaded content being encrypted, the access management by the storage controller may further include decrypting the encrypted pre-loaded content. The pre-loaded content may include audio, video, still images, text, picture, computer program, or any combination thereof.

In another embodiment of the foregoing approach, a card vending machine includes a memory card dispenser, where a memory card pre-loaded with content is being stored; a purchasing interface; and a controller. The purchasing interface is operable to receive from a user a buy indication that corresponds to an initial purchase transaction. The controller is operative to configure the memory card for managed access to the pre-loaded content. Such managed access includes limiting the access to a particular, buyer-selected portion of the pre-loaded content and making such limited access subject to and performed according to the buy indication of the initial purchase transaction.

With the card vending machine receiving a subsequent buy indication that corresponds to a subsequent purchase transaction (where the subsequent purchase transaction is being received from the user via the purchasing interface), the access management may further include expanding access to an additional portion of the pre-loaded content and making such expanded access subject to and performed according to the subsequent buy indication of the subsequent purchase transaction.

The pre-loaded content may include audio, video, still images, text, or any combination thereof.

The card vending machine may further include a communication interface that is operative to convey information about the initial and any subsequent purchase transactions to a remote device.

Additional features and advantages of the embodiments described are possible as will become apparent from the following drawings and description.

BRIEF DESCRIPTION OF THE DRAWINGS

For a better understanding of the invention with regard to the various embodiments, reference is made to the accompanying drawings, in which like numerals designate corresponding sections or elements throughout, and in which.

DETAILED DESCRIPTION OF PREFERRED EMBODIMENTS

The embodiments and various aspects thereof are further described in more details below. This description is not intended to limit the scope of claims but instead to provide examples of such embodiments.

The following discussion therefore presents exemplary embodiments, which include a device configured to have user-selectable content, a storage controller, and a method of controlling access to such user-selectable content. The exemplary embodiments may also include a card vending machine and a method of vending a memory card by a card vending machine.

The retailer of the device may carry out a one-time business deal with a content owner, where the retailer pays the content owner beforehand for purchasing a license to access a predefined limited number of audio/video tracks. This way, a user using a storage device that is preloaded with 100 song tracks, for example, may select to purchase up to this predefined number of song tracks (for example 20 songs). Accordingly, a retailer can load 100 song tracks for example on his memory cards, while pay the content owner a license for only for 20 song tracks. It should be noted that knowing beforehand which audio/video tracks are purchased/selected by the user is not a must.

The device of the exemplary embodiments, typically configured as a storage device, may have a configuration that complies with any playing device known in the art, including but not limited to a personal computer, DVD, mobile handset, MP3 player, any personal digital assistant (PDA), etc. As such, the use of the device may be applied via the standard playing keys, and identification of the user-selected portion may be received from the playing device interface that facilitates user selections, without the need for any specific hardware or software requirements for playing or purchasing rights to the pre-loaded content. Still, the device may be implemented in any way a host application is used for the selection indication.

The device and/or storage controller discussed herein may have a configuration that complies with any memory (e.g. flash memory), memory stick, and/or memory card format, such as a secured digital (SD) memory card format used for storing digital media such as audio, video, or picture files. The device may also have a configuration that complies with a multi media card (MMC) memory card format, a compact flash (CF) memory card format, a flash PC (e.g., ATA Flash) memory card format, a smart-media memory card format, a USB flash drive, or with any other industry standard specifications. One supplier of these memory cards is SanDisk Corporation, assignee of this application.

The storage device may also have a configuration complying with a high capacity SIM (HCS) memory card format. The HCS memory card format is a secure, cost-effective and high-capacity storage solution for the increased requirements of multimedia handset, typically configured to use a host's network capabilities and/or other resources, to thereby enable network communication.

The storage is a nonvolatile memory that retains its memory or stored state even when power is removed. The device may also apply to other erasable programmable memory technologies, including but not-limited to electrically-erasable and programmable read-only memories (EE- PROMs), EPROM, MRAM, FRAM ferroelectric and magnetic memories. Note that the device configuration does not depend on the type of removable memory, and may be implemented with any type of memory, whether it being a flash memory or another type of memory. The device may also be implemented with a one-time programmable (OTP) memory chip and/or with a 3-dimensional memory chip technology.

Host systems with which such memory cards are used include cellular telephones, personal computers, notebook computers, hand held computing devices, cameras, audio reproducing devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices. A PDA is typically known as user-held computer systems implemented with various personal information management applications, such as an address book, a daily organizer, and electronic notepads, to name a few.

Figure 1:
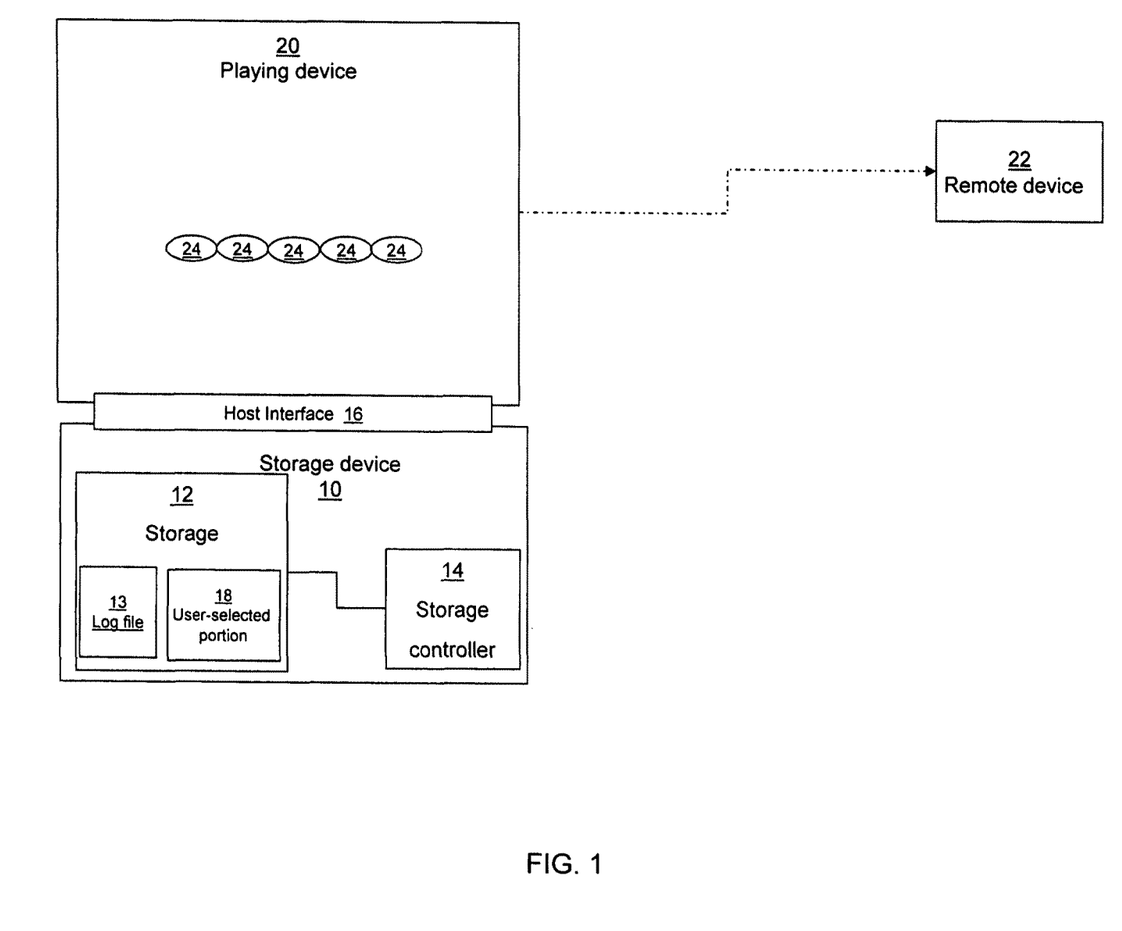
FIG. 1 is a block diagram of a device preloaded with content, according to one embodiment.

FIG. 1 is an exemplary block diagram of a device preloaded with content, the device configured as a storage device 10 to be in communication with a playing device according to one embodiment. The storage device 10 is in communication with a host via a host interface 16. The host of this exemplary embodiment has a configuration that complies with a playing device 20.

Storage device 10 includes a storage 12 that is pre-loaded with content, and a storage controller 14 that is operative to manage access to the pre-loaded content on the storage 12. The storage device 10 is configured to limit access to a user-selected portion 18 of the pre-loaded content and to make such limited access subject to and performed according to an indication of an initial purchase transaction.

The storage 12, being a flash memory for example, has the capacity to store pre-loaded content. The storage 12 (and the storage device 10) may have a configuration that complies with a memory card format, including a secured digital memory card format and a multimedia card format. The storage 12 can be configured as an array of memory cells (such as FLASH) having the capacity to store data in binary form in either a volatile or non-volatile manner. Note that having FLASH type memory cells is not meant as a limitation, as other embodiments using any appropriate type of memory cell are further applicable. Note that unused storage area on storage 12 may be used for the use to store his/her personal content. Also note that the preloaded content on storage 12 may also be modified at any time, by the retailer or card manufacturer for example. Hence, a device that is pre-loaded with certain content and has still not been purchased by a user may be pre-loaded with different, perhaps more updated content.

The pre-loaded content may include a plurality of user-selectable portions of the pre-loaded content, and the indication of the initial purchase transaction may include initial permission to use only one of the plurality of user-selectable portions of the pre-loaded content. The indication of the initial purchase transaction may include an identification of the user-selected portion and/or may be based on predetermined criteria for size and type of the user selected portion 18.

As an example, the criteria may be size of content, thus requiring a user to select a predetermined number of audio/video tracks. In case of a memory card pre-loaded with 100 different soundtracks, the storage device 10 may be configured to manage access to 20 song tracks in response to receiving an indication of a first purchase (e.g. $20), and to manage access to 40 song tracks in response to receiving an indication of a second purchase (e.g. $35). Hence, upon receiving an indication of the first purchase, the storage device 10 may provide an initial permission to use (i.e., to have full access to) only 20 song tracks.

According to another example, the criteria may be type of content, requiring the user to select a specific singer and/or band for example. The storage controller 14 may apply the predetermined criteria for delineating the user-selected portion 18 of the pre-loaded content. This enables a user to select any 10 songs for example (or any other predetermined number of audio/video tracks from the entire collection of content that is pre-loaded onto the device.

The storage device 10 may be configured to expand access to another one or more of the plurality of user-selectable portions of the pre-loaded content. The expandable access is subject to and performed according to a subsequent indication of one or more subsequent purchase transactions that correspond to the desired one or more user-selectable portions of the pre-loaded content. For example, the storage device 10 may be configured to expand access to 40 song tracks in response to receiving a subsequent indication that corresponds to the second purchase (e.g. $40). Hence, upon receiving the indication of the second purchase, the storage device 10 may expand permission to use (access) 40 song tracks.

Accordingly, content stored on the user-selected portion 18 may be modified and/or updated, either by the storage device or by the user himself/herself. For example, the storage device may enable the use of a new song or restrict the use of a particular video track after access to the particular video track has exceeded a predefined number.

The storage device 10 may be further configured to enable a preview of content and to make such preview independent of and unrelated to the indication of the initial purchase. For example, the storage device 10 may be configured to enable the user to hear the preloaded content independently of the initial purchase, thereby allowing the user a quick glimpse of each song before enabling the user to use this content. In case the pre-loaded content is encrypted on the storage 12, the storage device 10 may decrypt the encrypted pre-loaded content.

The storage device 10 may further be implemented with an application (which can be performed by the storage controller 12) that receives an indication of the user's content preferences/feedback or any other information and selectively processes this information, in order to propose new content, for example. This may be implemented, for example, upon the user hearing a preview of an audio/video track.

As mentioned above, the storage device 10 is in communication with a playing device 20 via a host interface 16. The host interface 16 is operative to convey information about the initial and any subsequent purchase transactions to the playing device 20, or to any other remote device 22 (that is external to the host) via the resources of the playing device 20. The information may be stored on the storage 12 in a log file 13 containing a log of the user's activity, which may be used as a feedback for the purpose of tracking purchases, etc. The information may be conveyed to the remote device 22, using the functionality of the playing device 20 for example, along with a storage device unique identification.

Communication between the storage device 10 and the playing device 20 can be via the host interface 16, or via any other communication channel known to those skilled in the art. As the storage device 10 and the playing device 20 are separate devices, the device 10 and the playing device 20 can be in communication with each other by way of an interface such, for example, a socket into which the playing device and storage device are physically ported. In other cases, the device and the playing device can be in communication with each other over a wired or a wireless communication channel well known in the art. Accordingly, the playing device 20 and/or the remote device 22 may be in communication with the storage device 10 and with each other over a wired or a wireless communication channel well known to those skilled in the art.

The playing device 20 is configured with a laying device interface, such as push buttons 24, that facilitate user selections. The push buttons 24 may comply with any playing device known in the art, including but not limited to a play/stop/pause button, present a previous track button, present a next track button, a record button, etc. These push buttons 24 may be operated by a user for selection of the user-selected content, for operating the playing device 20, for receiving an identification of the user-selected portion, etc.

For example, the user may operate a first push button for listening to a preview of a particular music track. A message inviting the user to purchase the content is played at the end of the preview by the playing device. If within a certain amount of time the playing devise identifies a request to access the same content again (received by manipulation of this first push button for example), the device unlocks the content making it fully accessible to the user (provided the user still has credit).

The host of the exemplary embodiments may be a specialized host device pre-configured with this functionality or a host device that has been configured to include this functionality. Furthermore, the storage 22 and the storage controller 14 may be implemented on any playing device, including an MP3 player, mobile handset, any personal digital assistant (PDA), etc.

Figure 2:
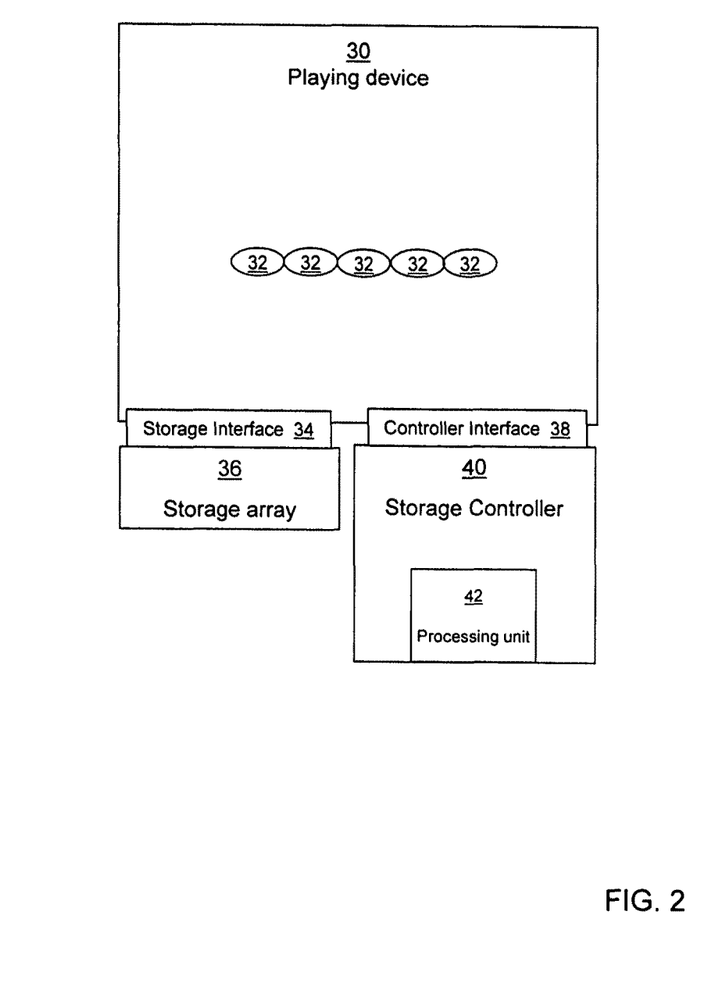
FIG. 2 is a block diagram of a storage controller, according to another embodiment.

FIG. 2 is an exemplary block diagram of a storage controller 40, the storage device being in communication with a playing device 30 according to another embodiment. The playing device 30 includes push buttons 32 that facilitate user selections, in a similar manner what is depicted herein above.

Communication between the storage controller 40 and the playing device 30 can be via a controller interface 38, or via any other communication channel known to those skilled in the art. As the storage controller 40 and the playing device 30 are separate devices, the storage controller 40 and the playing device 30 can be in communication with each other by way of an interface such, for example, a socket into which the playing device and the storage controller are physically ported. In other cases, the storage controller and the playing device can be in communication with each other over a wired or a wireless communication channel well known in the art.

Accordingly, communication between a storage array 36 (that is pre-loaded with content) and the playing device 30 can be via a storage interface 34, or via any other communication channel known to those skilled in the art.

Storage controller 36 includes a processing unit 46. The processing unit 46 is operative to communicate with the storage array 36 via the resources of the playing device 30. As such, the storage controller 40 is configured to manage access to the pre-loaded content stored on the storage array 36. In a similar manner to the storage controller of FIG. 1, the storage controller 40 is configured to limit the access to a user-selected portion of the pre-loaded content and to make such limited access subject to and performed according to an indication of an initial purchase transaction.

Figure 3:
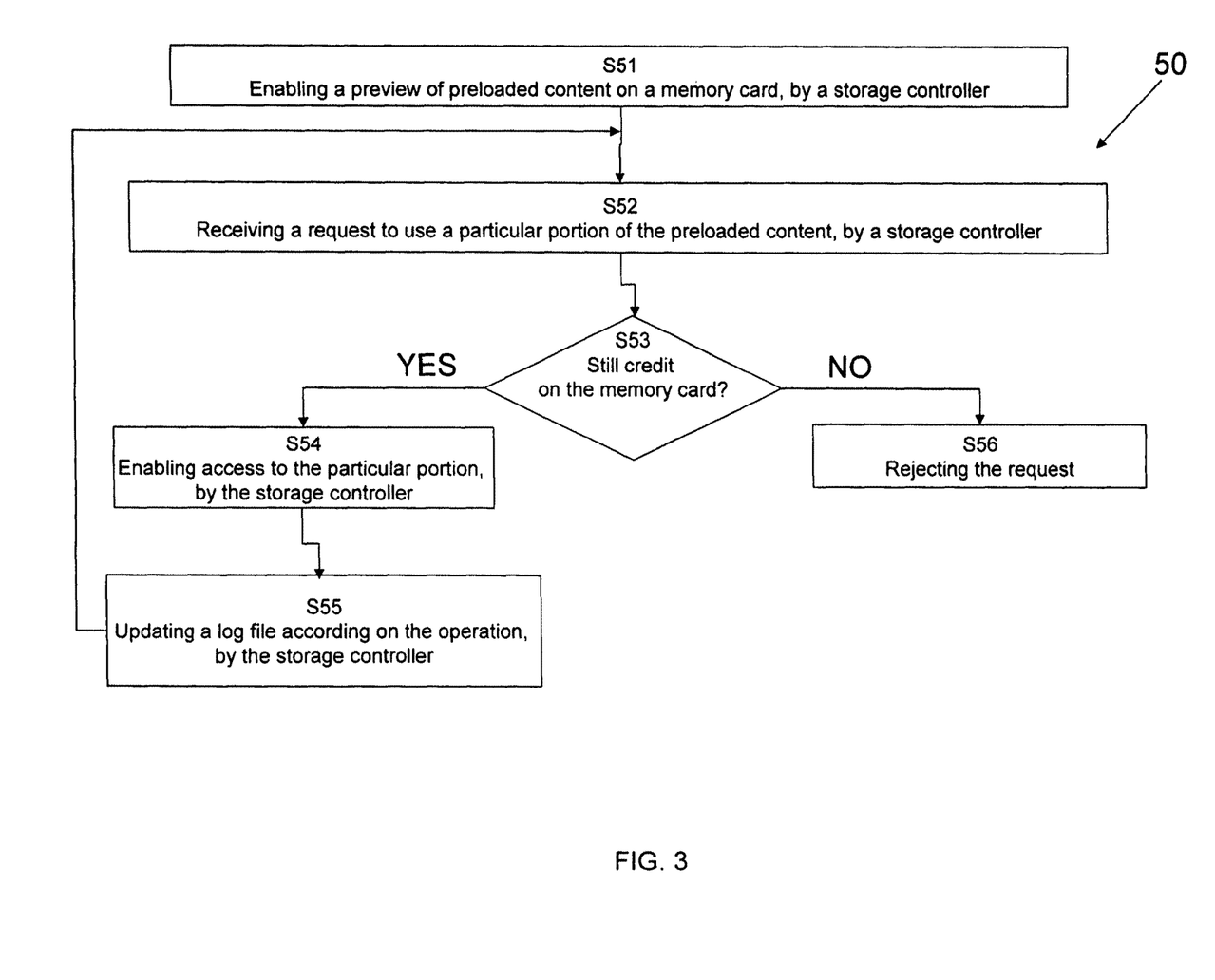
FIG. 3 is a flow chart of a method of controlling access to user-selectable content, in accordance with an exemplary embodiment.

FIG. 3 is an exemplary flow chart of a method 50 of controlling access to user selectable content, according to one embodiment. The method in this example may be performed by a controller of a device (such as a memory card), including but not necessarily the storage controller described in FIG. 1, or the processing unit of FIG. 2. A host, such as a playing device, may be preconfigured to support the functionalities described herein when communicating with such a controller and/or device. Accordingly, identification of the user-selected portion may be provided from any playing device interface that facilitates user selections.

At S51, the controller provides a preview of content preloaded onto the memory card, in response to a user operating push buttons on his/her playing device. Such preview may be enabled freely, independent of and unrelated to an indication of an initial purchase. As a result, the user may hear the audio/video tracks preloaded on the memory card before purchasing them. Note that in case the pre-loaded content is encrypted, the controller further decrypts the encrypted pre-loaded content.

At S52, the controller receives a request for using a particular, user selection portion of the preloaded content. The request, providing an indication of an initial purchase transaction at this phase, may be received in response to a user wishing to use a particular audio/video track. As an example, the initial purchase may provide an initial permission to use only 20 audio/video tracks from a total of 100 audio/video tracks preloaded onto a memory card.

Again, the request may be obtained by a user manipulating the push buttons on his/her playing device. Note that typically a single audio/video track is requested at a given point in time and access to a single audio/video track is enabled at a given point in time, but the exemplary embodiments may further be implemented to enable access to more than one audio/video track at a given point in time.

Next, at S53, the controller determines whether there is still credit on the memory card to enable access to the particular portion of the preloaded content. Such determination is based on the specific memory card configuration.

In the affirmative case S54 (i.e. in case there is still credit on the memory card for enabling access to new content), the controller enables access to the particular portion of the pre-loaded content on the memory card. As a result, the controller limits access to a permitted storage portion only, as defined by the indication of an initial purchase transaction. Then, a log file indicative of the user selection portion is updated accordingly (S55).

Following this, the method returns to step S52, where the controller now receives a subsequent request for using an additional portion of preloaded content. Note that following this phase, the controller determines whether there is still credit on the memory card to expand access to the additional portions of content.

However, in the negative case (i.e. there is no credit for enabling access to the particular portion, or to any additional portions, of the preloaded content) S56, the request is rejected.

Note that with the playing device (housing the storage controller) being in communication with an external device, information about the initial purchase transaction and subsequent purchase transactions may be conveyed to the external device, via the resources of the playing device.

Figure 4:
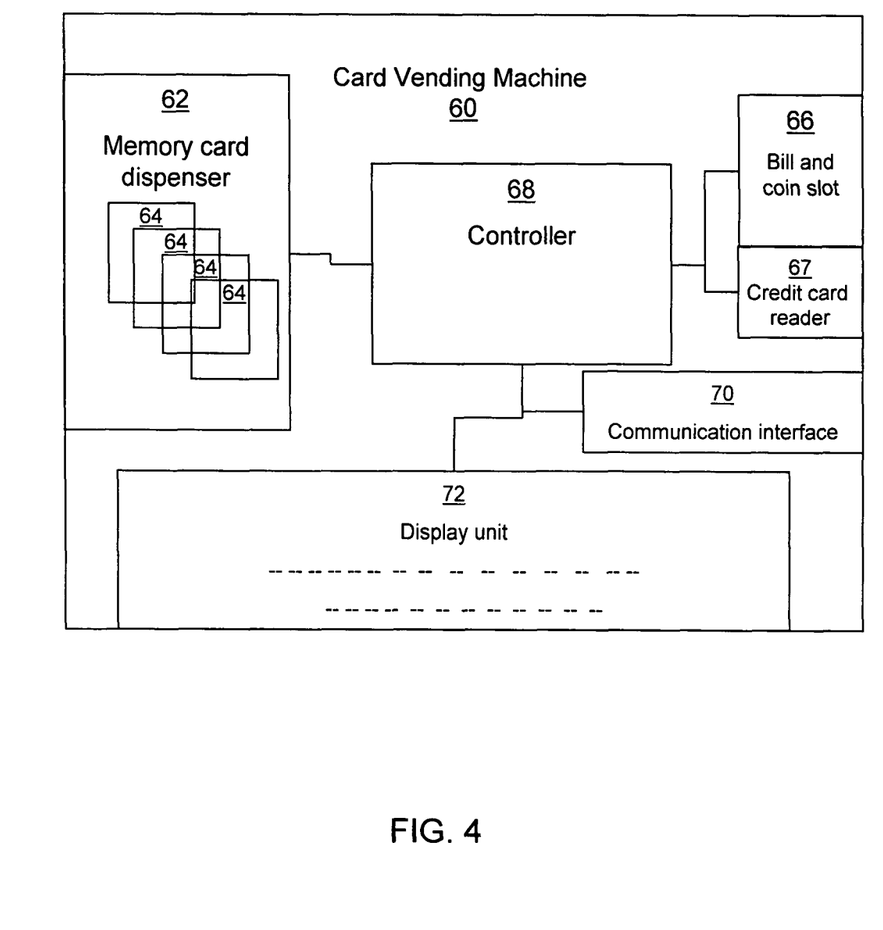
FIG. 4 is a block diagram of a card vending machine, according to one embodiment.

FIG. 4 is an exemplary block diagram of a card vending machine 60, according to one embodiment. Card vending machine 60 includes a memory card dispenser 62, where one or more memory cards 64 pre-loaded with content are being stored. Memory card may be the device of the arrangements depicted in FIG. 1.

The user selects the number of audio/video tracks he/she wishes to purchase by operating a display unit 72. The display unit 72 may be a touch-screen, or may be any other display having functionally keys for user-manipulation. A purchasing interface, such as a bill and coin slot 66 or a credit card reader 67, is used by the user for paying the amount of money that corresponds to the purchase of the user. The amount of money is indicated on the display unit 72. By inserting money to the payment interface, the user provides the card vending machine 60 with a buy indication that corresponds to the specific purchase transaction. The selection menu and other information may be presented on the display unit 72.

Note that there is no limit to the number and type of subsequent buy indications corresponding to the subsequent purchase transactions that are received by the card vending machine 60 following the initial buy indication. The subsequent buy indication may be received for a same memory card, or for different kinds of memory cards.

A controller 68, configured within the card vending machine 60, is operative to configure the memory cards 64 for managed access to the pre-loaded content. Again, the card vending machine 60 may limit and/or expand access to a particular, buyer-selected portion of the pre-loaded content (for example 20 songs only) and make such limited access subject to and performed according to the buy indication of the purchase transaction(s).

A communication interface 70, being in a communication channel link with a remote device, may be operative to convey information about the initial and any subsequent purchase transactions to the remote device. The information may include any indication relating to the user-selected portion and/or the user's preferences, and may be used as a feedback for the purpose of tracking purchases, etc. The information may be further conveyed to the remote device along with a storage device unique identification.

Figure 5:
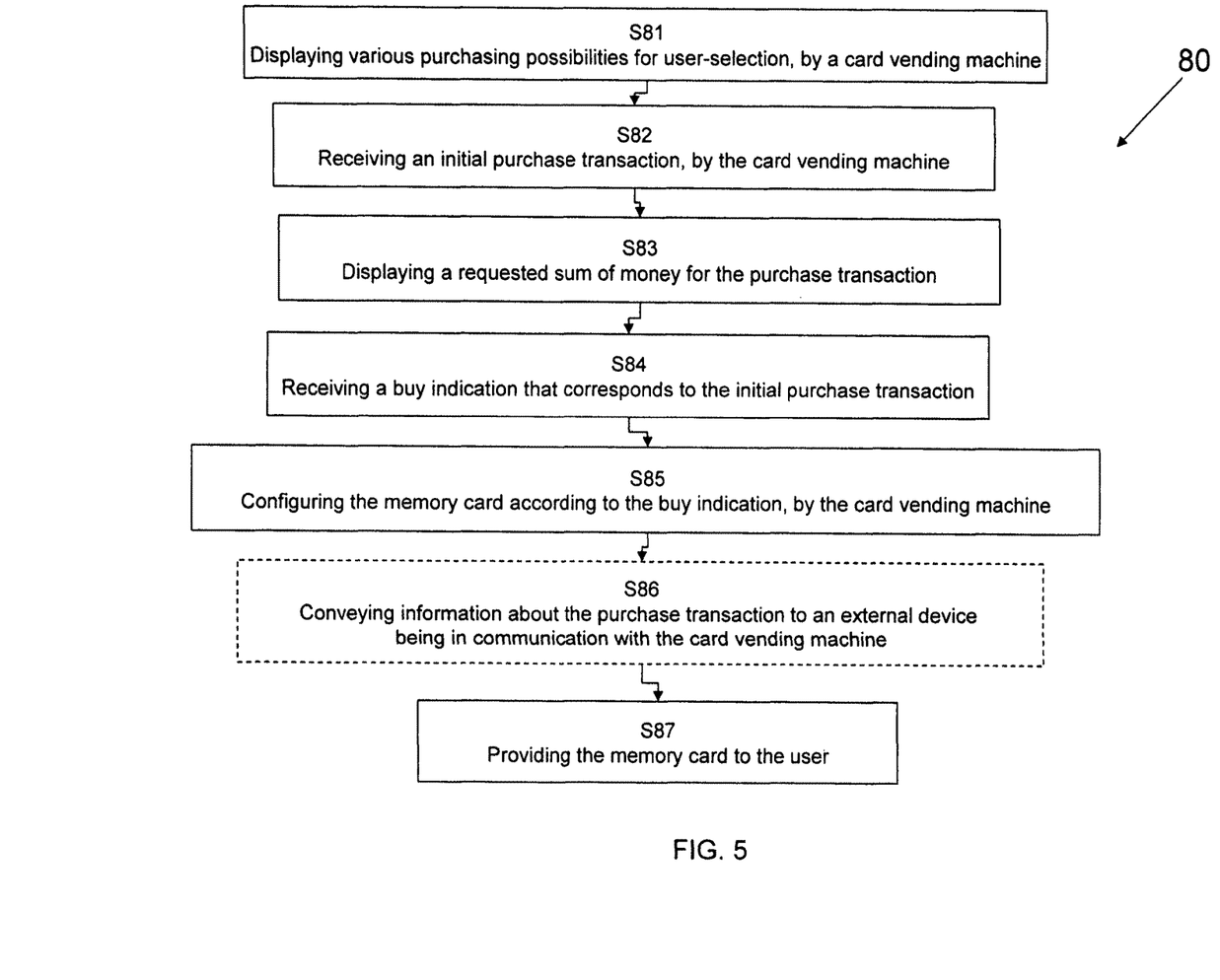
FIG. 5 is a flow chart of a method of vending a memory card using a card vending machine, according to one embodiment.

FIG. 5 is an exemplary flow chart of a method 80 of vending a memory card by a card vending machine, according to one embodiment. The card vending machine of this embodiment has one or more memory cards pre-loaded with content, the memory cards stored on a card dispenser. The memory card stored may be the device of the arrangements depicted in FIG. 1 or FIG. 2; and the pre-loaded content may include audio, video, still images, text, picture, computer program, or any combination thereof.

At S81, a menu is opened and various purchasing possibilities are being displayed for user selection, by the card vending machine. Next, the card vending machine receives an initial purchase transaction from a user (S82). This step may be performed by the user selecting the desired portion of the pr-loaded content (e.g., specific music tracks).

At S83, a requested sum of money for the purchase transaction is now displayed on a display of the card vending machine. The requested sum of money is calculated based on the initial purchase transaction. With respect to the example brought herein above, the user may now purchase up to 20 songs.

At S84, with the user inserting the requested sum of money, the card vending machine receives a buy indication that corresponds to the initial purchase transaction.

At S85, the card vending machine now configures a memory card (typically stored on the card vending machine) for managed access to the pre-loaded content. Such access management includes limiting the access to a particular, buyer-selected portion of the pre-loaded content and making such limited access subject to and performed according to the buy indication of the initial purchase transaction. Hence, the memory card is now configured to limit access to only the permitted number of songs, according to the buy indication. Note that this step may be further applied on a memory card that is not stored on the card vending machine, in response to a user inserting such memory card into a card slot of the card vending machine.

At S86, information about the initial purchase transaction is optionally conveyed, by the card vending machine, to an external device being in communication with the card vending machine. Conveying information to a remote device may be performed for the purpose of tracking purchases, etc. The information may be conveyed to the external device along with the memory card's unique identification, etc. Then at S87, the memory card is provided to the user.

It should be noted that it may be further be applicable to provide a card vending machine storing memory cards that are pre-configured with the access management functionality described herein above. Such card vending machine may be provided to only distribute a memory card to a user when receiving a buy indication and does not configure a memory card at all.

As will be appreciated by those familiar in the art, current devices employ a wide variety of different architectures and it is expected that new architectures will continue to be developed. In general, the exemplary embodiments may be employed in conjunction with a wide variety of different types of memory, so long as the storage device being used has suitable processing power.

The embodiments, various examples of which are described herein, may be realized in hardware, software, firmware or any combination thereof. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Having described the various embodiments of systems and a method, it is to be understood that the description is not meant as a limitation, since further modifications will now suggest themselves to those skilled in the art, and it is intended to cover such modifications as fall within the scope of the appended claims.

The invention claimed is:

1. A removable storage device having user-selectable content, the device comprising:
   a storage having the capacity to store pre-loaded content, the storage utilizing three dimensional memory chip technology; and
   a storage controller configured to:
   manage access to the pre-loaded content, wherein access management includes limiting the access to one of a plurality of user-selected portions of the pre-loaded content stored in the device and making such limited access subject to and performed according to an indication of an initial purchase transaction; and select and propose new content of the pre-loaded content for selection and purchase by a user, wherein the storage controller is configured to select the new content for proposal based on a content preference of the user indicated by content of the initial purchase transaction; and wherein the removable storage device is a removable memory card configured to be plugged into a hand held computing device.

2. The removable storage device of claim 1, wherein the indication of the initial purchase transaction includes an identification of the one of the plurality of user-selected portions.

3. The removable storage device of claim 1, wherein the indication of the initial purchase transaction includes initial permission to use only the one of the plurality of user-selectable portions of the pre-loaded content.

4. The removable storage device of claim 1, wherein the access management includes expanding the access to another one or more of the plurality of user-selectable portions of the pre-loaded content, the expandable access being subject to and performed according to a subsequent indication of one or more subsequent purchase transactions corresponding to such one or more user-selectable portions of the pre-loaded content.

5. The removable storage device of claim 1, in which the access management by the storage controller further includes receiving an identification of the user one of the plurality of selected portions from a playing device interface that facilitates user selections.

6. The removable storage device of claim 1, wherein the pre-loaded content is encrypted.

7. The removable storage device of claim 6, wherein the access management by the storage controller further includes decrypting the encrypted pre-loaded content.

8. The removable storage device of claim 1, wherein the pre-loaded content includes audio, video, still images, text, picture, computer program, or any combination thereof.

9. The removable storage device of claim 1, wherein information about the initial and any subsequent purchase transactions is conveyed to an external device.

10. The removable storage device of claim 1, wherein the initial purchase transaction is based on predetermined criteria for size and type of the one of the plurality of user selected portions, and wherein the access management by the storage controller further includes applying the predetermined criteria for delineating the one of the plurality of user-selected portions of the pre-loaded content.

11. The removable storage device of claim 1, wherein the storage has a configuration that complies with a memory card format, including a secured digital memory card format and a multimedia card format.

12. The removable storage device of claim 1, wherein the storage of the removable memory card comprises flash memory.

13. The removable storage device of claim 1, wherein the access management by the storage controller includes enabling a preview to the pre-loaded content and making such preview independent of and unrelated to the indication of the initial purchase.

14. The removable storage device of claim 1, wherein the pre-loaded content is accessible without requiring an online connection to a network.

15. The removable storage device of claim 1, wherein the hand held computing device is a cellular telephone.

16. The removable storage device of claim 1, wherein to propose new content of the pre-loaded content for selection by the user, the storage controller is further configured to preview pre-loaded content for selection by the user based in part on the selection by the user of the user-selected portions of the pre-loaded content.

17. A removable memory card configured to be plugged into a hand held computing device, the removable memory card comprising:

a storage having the capacity to store pre-loaded content, the storage utilizing three dimensional memory chip technology;

an interface configured to reversibly connect the removable memory card to a hand held computing device; and a processing unit coupled to the interface and configured to:

manage access to the pre-loaded content, wherein access management includes limiting the access to one of a plurality of user-selected portions of the pre-loaded content stored in the storage of the removable memory card and making such limited access subject to and performed according to an indication of an initial purchase transaction: and select and propose new content of the pre-loaded content for selection and purchase by a user, wherein the processing unit is configured to select the new content for proposal based on a content preference of the user indicated by content of the initial purchase transaction.

18. The removable memory card of claim 17, wherein the indication of the initial purchase transaction includes an identification of the one of the plurality of user-selected portions.

19. The removable memory card of claim 17, wherein the indication of the initial purchase transaction includes initial permission to use only the one of the plurality of user-selectable portions of the pre-loaded content.

20. The removable memory card of claim 17, wherein the access management includes expanding the access to another one or more of the plurality of user-selectable portions of the pre-loaded content, the expandable access being subject to and performed according to a subsequent indication of one or more subsequent purchase transactions corresponding to such one or more user-selectable portions of the pre-loaded content.

21. The removable memory card of claim 17, in which the access management further includes receiving an identification of the one of the plurality of user-selected portions from a playing device interface that facilitates user selections.

22. The removable memory card of claim 17, wherein with the pre-loaded content being encrypted, the access management further includes decrypting the encrypted pre-loaded content.

23. The removable memory card of claim 17, wherein the pre-loaded content includes audio, video, still images, text, picture, computer program, or any combination thereof.

24. The removable memory card of claim 17, wherein information about the initial and any subsequent purchase transactions is conveyed to an external device.

25. The removable memory card of claim 17, wherein the initial purchase transaction is based on predetermined criteria for size and type of the one of the plurality of user-selected portions, and wherein the access management further includes applying the predetermined criteria for delineating the one of the plurality of user-selected portions of the pre-loaded content.

26. The removable memory card of claim 17, wherein the access management includes enabling a preview to the pre-loaded content and making such preview independent of and unrelated to the indication of the initial purchase.

27. The removable memory card of claim 17, wherein the pre-loaded content is accessible without requiring an online connection to a network.

28. The removable memory card of claim 17, wherein the hand held computing device is a cellular telephone.

29. The removable memory card of claim 17, wherein to propose new content of the pre-loaded content for selection the user, the processing unit is further configured to preview pre-loaded content for selection by the user based in part on the selection by the user of the user-selected portions of the pre-loaded content.

\* \* \* \* \*